United States Patent
Rainisto

(10) Patent No.: US 10,241,990 B2
(45) Date of Patent: Mar. 26, 2019

(54) GESTURE BASED ANNOTATIONS

(71) Applicant: Microsoft Technology Licensing, LLC, Redmond, WA (US)

(72) Inventor: Roope Rainisto, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 14/836,546

(22) Filed: Aug. 26, 2015

(65) Prior Publication Data

US 2017/0060828 A1 Mar. 2, 2017

(51) Int. Cl.
G06F 17/00 (2006.01)
G06F 17/24 (2006.01)
G06F 3/16 (2006.01)
G06F 3/01 (2006.01)
H04L 12/18 (2006.01)
G10L 15/26 (2006.01)
H04N 7/14 (2006.01)

(52) U.S. Cl.
CPC ............ *G06F 17/241* (2013.01); *G06F 3/017* (2013.01); *G06F 3/16* (2013.01); *H04L 12/1831* (2013.01); *G10L 15/26* (2013.01); *H04N 7/147* (2013.01)

(58) Field of Classification Search
CPC .............................. G06F 17/241; G06F 3/017
See application file for complete search history.

(56) References Cited

U.S. PATENT DOCUMENTS

| | | | |
|---|---|---|---|
| 6,012,030 A | 1/2000 | French-St George et al. | |
| 7,321,854 B2 | 1/2008 | Sharma et al. | |
| 7,929,949 B2 | 4/2011 | Anderl | |
| 8,537,196 B2* | 9/2013 | Hegde | H04N 7/157 348/14.09 |
| 8,612,211 B1 | 12/2013 | Shires et al. | |
| 2007/0129942 A1* | 6/2007 | Ban | G06F 17/241 704/235 |
| 2010/0204994 A1* | 8/2010 | Kennewick | G10L 15/22 704/257 |
| 2010/0253689 A1* | 10/2010 | Dinicola | H04M 3/567 345/467 |

(Continued)

OTHER PUBLICATIONS

Amma, et al., "Multimodal Interaction", Published on: Nov. 8, 2013 Available at: http://csl.anthropomatik.kit.edu/downloads/vorlesungsinhalte/DEIB1314_Multimodal_Interaction.pdf.

(Continued)

*Primary Examiner* — Scott T Baderman
*Assistant Examiner* — Barbara M Level

(57) ABSTRACT

In an embodiment a device to convert conversations from a meeting to text and annotate the text is disclosed. In an embodiment a device is disclosed, comprising: a microphone; a camera; a processor; and a storage comprising a set of instructions; wherein the set of instructions causes a processor to: receive from the microphone, an audio recording containing speech of a participant of a meeting; receive from the camera, a video of the participant; identify the participant; convert the speech of the participant to a digital text; develop a skeletal map of the participant; recognize a gesture of the participant from the skeletal maps; detect and identify a target of the gesture; based on the target and the gesture determine an annotation for the digital text corresponding to a point of time of the gesture.

20 Claims, 8 Drawing Sheets

(56) References Cited

U.S. PATENT DOCUMENTS

| | | | | |
|---|---|---|---|---|
| 2011/0289455 | A1* | 11/2011 | Reville | G06F 3/011 715/830 |
| 2011/0317871 | A1* | 12/2011 | Tossell | G06K 9/00342 382/103 |
| 2012/0030637 | A1* | 2/2012 | Dey | G06F 3/017 715/863 |
| 2012/0159290 | A1* | 6/2012 | Pulsipher | G06K 9/00369 714/819 |
| 2012/0204118 | A1* | 8/2012 | Lefar | G06F 3/04883 715/756 |
| 2012/0249416 | A1* | 10/2012 | Maciocci | G06F 3/011 345/156 |
| 2015/0049162 | A1* | 2/2015 | Kurupacheril | H04N 7/15 348/14.08 |
| 2015/0085058 | A1* | 3/2015 | Zhang | H04N 7/142 348/14.02 |
| 2015/0201162 | A1* | 7/2015 | Griffin | H04L 12/1822 348/14.07 |
| 2016/0321841 | A1* | 11/2016 | Christen | G06T 19/006 |

OTHER PUBLICATIONS

Campbell, et al., "A Multimedia Database of Meetings and Informal Interactions for Tracking Participant Involvement and Discourse Flow", In Proceedings of Fifth International Conference on Language Resources and Evaluation, May 24, 2006, 4 pages.

Renals, Steve, "Recognition and Understanding of Meetings", In Proceedings of Human Language Technologies Annual Conference of the North American Chapter of Association for Computational Linguistics, Jun. 2010, pp. 1-9.

Rui, et al., "Viewing Meetings Captured by an Omni-Directional Camera", In Proceedings of Conference on Human Factors in Computing Systems, Mar. 31, 2001, 8 pages.

Renals, Steve, "Automatic Analysis of Multiparty Meetings", In Journal of Sadhana, vol. 36, Issue 5, Oct. 2011, pp. 917-932.

Guetl, et al., "Smart Multimedia Meeting Information Retrieval for Teaching and Learning Activities", In Proceedings of International Conference on Society for Information Technology & Teacher Education, vol. 2006, No. 1, Mar. 19, 2006, 6 pages.

Ou, et al., "Gestural Communication over Video Stream: Supporting Multimodal Interaction for Remote Collaborative Physical Tasks", In Proceedings of Fifth International Conference on Multimodal Interfaces, Nov. 5, 2003, 8 pages.

Oviatt, et al., "Integration and Synchronization of Input Modes during Multimodal Human-Computer Interaction", In Proceedings of ACM SIGCHI Conference on Human Factors in Computing Systems, Mar. 27, 1997, pp. 415-422.

Yoon, et al., "RichReview: Blending Ink, Speech, and Gesture to Support Collaborative Document Review", In Proceedings of 27th ACM User Interface Software and Technology Symposium, Oct. 5, 2014, 10 pages.

Ng-Thow-Hing, et al., "Synchronized Gesture and Speech Production for Humanoid Robots", In Proceedings of IEEE/RSJ International Conference on Intelligent Robots and Systems, Oct. 18, 2010, pp. 4617-4624.

Waibel, et al., "Smart: The Smart Meeting Room Task at ISL", In Proceedings of Interactive Systems Laboratories (ISL), Carnegie Mellon University and Karlsruhe University Germany.

Niijholt, Anton, "Meetings in the Virtuality Continuum: Send Your Avatar", In the Proceeding of the 2005 International Conference on Cyberworlds, Nov. 23, 2005, 8 Pages.

"International Search Report and Written Opinion Issued in PCT Application No. PCT/US2016/043802", dated Oct. 19, 2016, 13 Pages.

* cited by examiner

GESTURE BASED ANNOTATIONS

BACKGROUND

Meetings involve multiple participants and interactions in different modes between the participants. It may be of interest to make a record of at least some interactions that take place in a meeting. Meeting transcripts or meeting minutes have been popularly used to record verbal aspects of communication in a meeting. Traditionally, transcripts of a meeting may be made by a person present in the meeting. Currently, transcripts may be generated by recording the conversation in a meeting and converting it to text using speech recognition technology. Meeting videos may also be recorded in some cases for future reference. To contextualize or complement text in a transcript, annotations can be used. Annotations may be, for example, indicators of emphasis, speech directed towards a particular person, requests, orders etc. Annotations to text transcribed using speech recognition, if supported, may either be done manually or be based upon verbal cues by a speaker. Manual annotations may include a person inputting or selecting an annotation using an input device. Verbal cue based annotation may include speech recognition of a verbal cue. A verbal cue may be associated with a particular annotation. In the event a verbal cue is detected, transcribed text corresponding to a time period around the verbal cue may be annotated with the corresponding annotation.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In an embodiment a device to convert conversations from a meeting to text and annotate the text is shown. In an embodiment a conversation converter is disclosed, comprising a processor, and a storage medium comprising a set of instructions. The set of instructions causes a processor to receive an audio recording containing speech of a participant of a meeting, receive a video of the participant, identify the participant, convert the audio recording of the participant to a digital text, develop a skeletal map of the participant, recognize a gesture of the participant from the skeletal maps, and detect and identify a target of the gesture. Based on the target and the gesture, the conversation converter determines an annotation for the digital text corresponding to a point of time of the gesture.

Many of the attendant features will be more readily appreciated as they become better understood by reference to the following detailed description considered in connection with the accompanying drawings and corresponding reference numerals.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Figure 1:
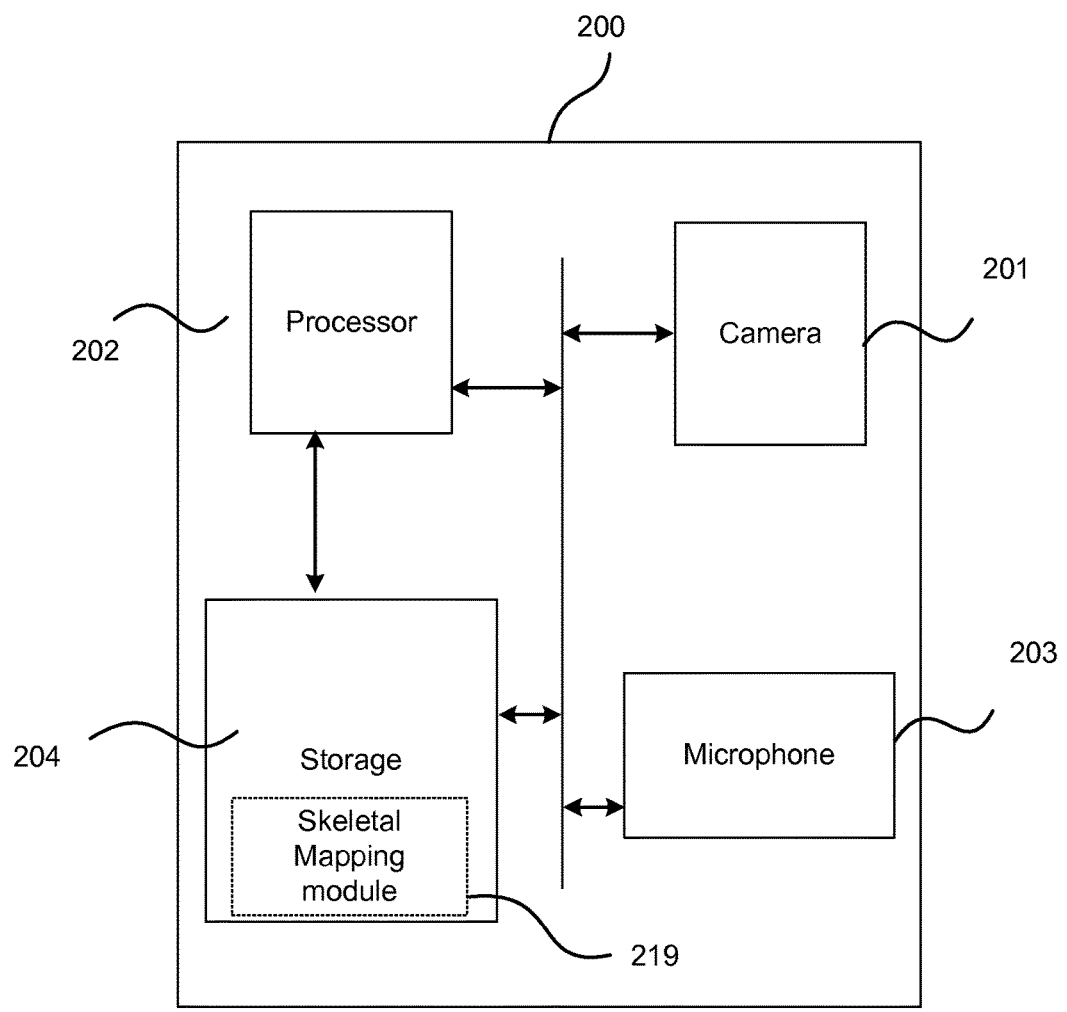
FIG. 1 illustrates a schematic representation of a device to record and annotate meeting transcripts according to an embodiment.

FIG. 1 shows a schematic illustration of a device 200 to record and annotate meeting transcriptions according to an embodiment. The device 200 may comprise at least one camera 201, at least one microphone 203, at least one processor 202 and at least one storage 204 comprising instructions that cause the processor to implement functionality described herein. The storage 204 may, among other instructions, comprise a skeletal mapping module 219. According to an embodiment, the device 200 may record and annotate meeting transcripts in real time. In some embodiments, the device 200 may also record and annotate transcripts from a previously recorded session where the recording includes both video and audio. According to an embodiment, a meeting may include any verbal exchange or interaction between at least two persons. A meeting may, for example, be a business or office meeting, an informal gathering, a social event, a lecture, a seminar etc.

Referring to an embodiment illustrated in FIG. 1, at least one camera 201 may be configured to capture video of the meeting. A microphone 203 may be configured to capture audio from the meeting space. Camera 201 and microphone 203 may be coupled with a processor 202 and a storage 204 such that the recording of audio and video are appropriately synchronized. A camera 201 may be in at least one way communication with a processor 202 and/or a storage 204. A microphone 203 may be in at least one way communication with a processor 202 and/or a storage 204. In an embodiment a camera 201 and a microphone 203 may comprise a single device. Such a device may be, for example, a video camera, a web camera, a depth camera, an array of cameras, a still camera capable of high frame rate etc. In an embodiment, a microphone 203 may be an array microphone capable of beamforming. Beamforming may be used to capture audio from a single speaker from a plurality of speakers. In an embodiment, a camera 201 may be a 360° view camera. In an embodiment, a camera 201 comprises an array of cameras that are capable of recording the meeting from different perspectives.

A camera 201 may capture a video of participants in a meeting while a microphone 203 may capture an audio of participants in a meeting. The processor 202 may analyze video from a video camera 201 to recognize the participants of a meeting. The processor 202 may analyze audio from the microphone 203 to convert the audio to digital text. An awareness of location of the participants in a meeting may be developed by the processor 202. The location awareness may include human participants and physical objects like, for example, white boards, models, screens etc. Awareness of location may be in the form of coordinates in a multi-dimensional coordinate system. Each participant and/or a physical object in a meeting may be assigned coordinates in the coordinate system. A processor 202 may analyze video from a camera 201 to assign coordinates to participants and/or physical objects. In an embodiment, the analysis of video may be done on individual frames comprising the video. Image processing techniques may be used to detect objects in an image. In an embodiment, physical parameters of a camera 201 may be utilized to calculate distances between detected objects in an image and/or between an object and a camera 201. For example, given the focal length of the camera 201 and a measurement of some reference object, a relationship can be developed between dimensions as on image and distance from the camera which may be used to calculate distance of other objects from the camera. According to an embodiment, the reference object may be one of the users. Some body measurements of the user may be known. According to another embodiment, the average distance between the human eyes or inter-pupillary distance, may be used as a reference. According to an embodiment, the average inter-pupillary distance may be taken to be 6 Centimeters. The angular separation between the objects may also be calculated. For example, given the aperture angle of a camera, angular separation between objects in an image captured by the camera may be calculated. Some or all of this information may be utilized by the processor 201 to assign coordinates to the objects in the video from camera 201.

According to an embodiment, analysis of the parallax effect may be utilized to calculate distances between the participants. According to another embodiment, the device may further comprise a gyroscope (not illustrated in FIG. 11). The height at which the camera 201 is placed may be known. The camera may be tilted to focus on the point on floor where a meeting participant is sitting or standing and the angle of tilt of the camera 201 may be measured by the gyroscope. The angle from the gyroscope and height of the camera above the floor may be utilized to calculate the distance of the participant from the camera 201. This distance and a ratio of measured dimensions, for example in number of pixels, on an image and actual values of a reference parameter like inter-pupillary distance may, for example, be then used to calculate approximate distances of other people from the camera 201. Angular separation between the participants and their respective distances from the camera may then be utilized for assignment of coordinates to each participant.

The processor 202 may analyze video from the camera 201 and/or audio from the microphone 203 to determine a speaker and the speaker's location with respect to other participants. Object tracking and/or acoustic localization may be used to differentiate a speaker from other participants. Image recognition, voice recognition, biometric recognition or a combination thereof may be then utilized to identify the speaker. The processor 202 may associate digital text with the corresponding speaker. Concurrently with analysis of audio from a meeting, a skeletal mapping module 219 may cause the processor 202 to generate real time skeletal maps of participants of a meeting by processing video from a camera 201. Skeletal maps may be analyzed by the processor 202 to detect and recognize gestures. The processor 202 may recognize an initiator as well as at least one target of a gesture from the skeletal maps and an awareness targets' location. A target of a gesture may be a human participant of the meeting or a physical object, for example, a meeting aid. Meeting aids may include white boards, projector screens, electronic displays or any physical object. In an embodiment, a target of a gesture may be located and identified from the angle and direction of at least one limb from a skeletal map in conjunction with already processed location awareness. In an embodiment, a target of a gesture may be located by using image recognition techniques to discern body movement and/or orientation. In an embodiment, a target of a gesture may be located and/or identified by a combination of skeletal maps and image recognition etc. Gestures may be user programmable. For each gesture a corresponding annotation may be defined.

If a gesture is recognized, the processor 202 may designate a period of time as a gesture window. A gesture window may begin a length of time before the point of time when the gesture is made. A gesture window may end after a length of time after the point of time when the gesture was made. The length of a gesture window may be user definable. On the basis of the recognized gesture, the processor 202 may associate a predefined annotation to the digital text generated from the audio of a gesture making speaker during the gesture window. Each recognizable gesture may have an annotation associated with it. According to an embodiment, the annotation associated by the processor 202 to the digital text may comprise the predefined annotation associated with a gesture, an identity of the initiator of the gesture and an identity of the target of the gesture. According to an embodiment, a database comprising gestures and associated annotations may be made available to the processor 202. According to an embodiment, annotation associated with a gesture may be user definable. In an embodiment, a gesture may comprise pointing towards a target in a particular fashion. This may be defined, for example, as an action point. An action point in a transcript may mean, for example, that a speaker is assigning a task to the target of a gesture.

According to an embodiment, a speaker may not need to give verbal cues to identify a target and/or specify an annotation. Instead, gestures which might be normally associated with a particular contextual meaning may be defined, for device 200, as triggers for annotation. In an embodiment, annotations for a gesture may be defined so as to be substantially similar to their real world meaning. In an embodiment, when a gesture is recognized, the device 200 may give feedback, for example, as a non-intrusive low volume audio beep, as a flash or flicker of an LED (not illustrated in FIG. 1), etc.

In an embodiment, based on an identity of a speaker, the processor 202 may choose a specific speech recognition profile for that speaker. In an embodiment, the processor 202 may analyze audio from the microphone 203 to recognize and identify the speaker. In an embodiment, the processor 202 may use audio from the microphone 203 to locate the speaker using acoustic source localization. In an embodiment, a processor 202 may use image recognition in conjunction with acoustic source localization and/or speech recognition to identify a speaker and associate corresponding digital text to their name in a transcript.

In an embodiment, computer readable instructions stored in a storage 204 may cause the processor 202 to function as illustrated herein.

Figure 2:
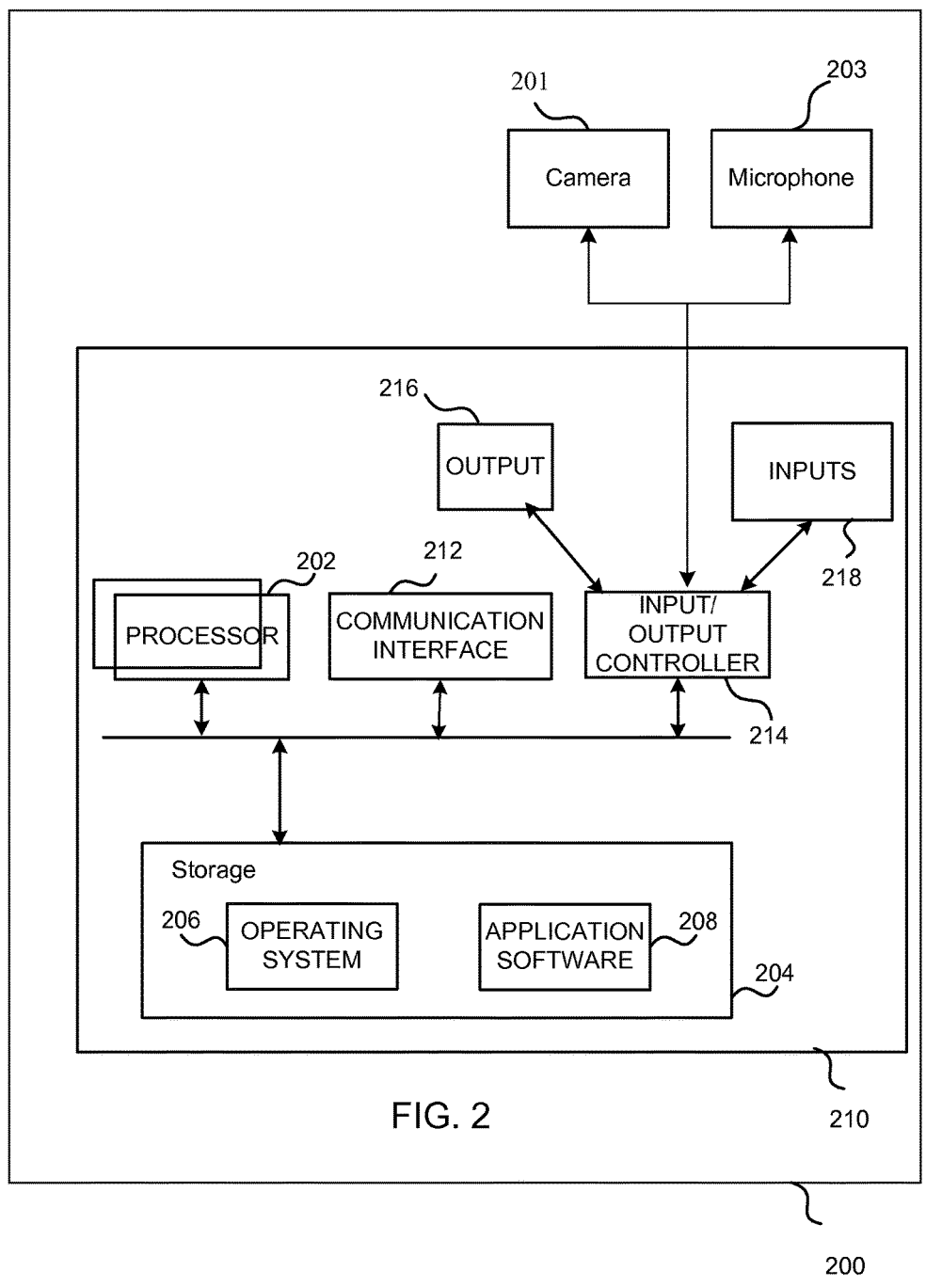
FIG. 2 illustrates a schematic representation of a device to record and annotate meeting transcripts according to another embodiment.

FIG. 2 illustrates an embodiment which may perform functionality similar to an embodiment illustrated in FIG. 1. A device 200 may be implemented as a form of a computing and/or electronic device 210 coupled to at least one microphone 203 and at least one camera 201. The device 200 may comprise one or more processors 202 which may be microprocessors, controllers or any other suitable type of processors for processing computer executable instructions to control the operation of the device 200. Platform software comprising an operating system 206 or any other suitable platform software may be provided on the apparatus to enable application software 208 to be executed on the device. Application software 208 may comprise, among other instruction sets, skeletal mapping module 219 (not illustrated in FIG. 2).

The device 200 may comprise an input/output controller 214 arranged to output information to an output device 216 which may be separate from or integral to the device 200. The input/output controller 214 may also be arranged to receive and process an input from one or more input devices 218, 201, and 203. In one embodiment, the output device 216 may also act as the input device. The input/output controller 214 may also output data to devices other than the output device, e.g. a locally connected printing device. According to an embodiment, the at least one camera 201 and at least one microphone 203 may be coupled to the at least one processor 202 via the input/output controller 214. According to another embodiment, the at least one camera 201 and at least one microphone 203 may be coupled to the at least one processor 202 via the communication interface 212. Further, the at least one camera 201 and/or the at least one microphone 203 may be internal to the device 200 or may be configured externally to the device 200. For example, camera 201 and microphone 203 may be configured as an input 218, although FIG. 2 illustrates them as separate entities, or they may be external devices that can be plugged into the device 210.

The term 'computer', 'computing device', 'apparatus' or 'mobile apparatus' is used herein to refer to any apparatus with processing capability such that it can execute instructions. Those skilled in the art will realize that such processing capabilities are incorporated into many different devices and therefore the terms 'computer' and 'computing device' each include PCs, servers, mobile telephones (including smart phones), tablet computers, Voice over IP phones, set-top boxes, media players, games consoles, personal digital assistants, video conferencing devices and many other devices. Further, as those skilled in the art will appreciate, the present embodiments may be suitable for application in a variety of different types of computing devices which comprise and/or can be coupled to at least one microphone and at least one camera and which may be configured to annotate meeting transcriptions.

Computer executable instructions may be provided using any computer-readable media that are accessible by the device 200. Computer-readable media may include, for example, computer storage media, herein referred to as storage 204, such as a memory and communications media. Computer storage media, such as a memory, include volatile and non-volatile, removable and non-removable media implemented in any method or technology for storage of information such as computer readable instructions, data structures, program modules or other data. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media do not include communication media. Therefore, a computer storage medium should not be interpreted to be a propagating signal per se. Propagated signals may be present in computer storage media, but propagated signals per se are not examples of computer storage media. Although the storage 204 is shown within the device 200, it will be appreciated, by a person skilled in the art, that the storage 204 may be distributed or located remotely and accessed via a network or other communication link (e.g. using a communication interface 212).

The functionality described herein can be performed, at least in part, by one or more hardware logic components. According to an embodiment, the computing device 200 is configured by the program code 206, 208 when executed by the processor 202 to execute the embodiments of the operations and functionality described. In an embodiment, the functionality described herein may be performed by firmware stored in 204, replacing operating system 206 or application software 208 or both. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 3A:
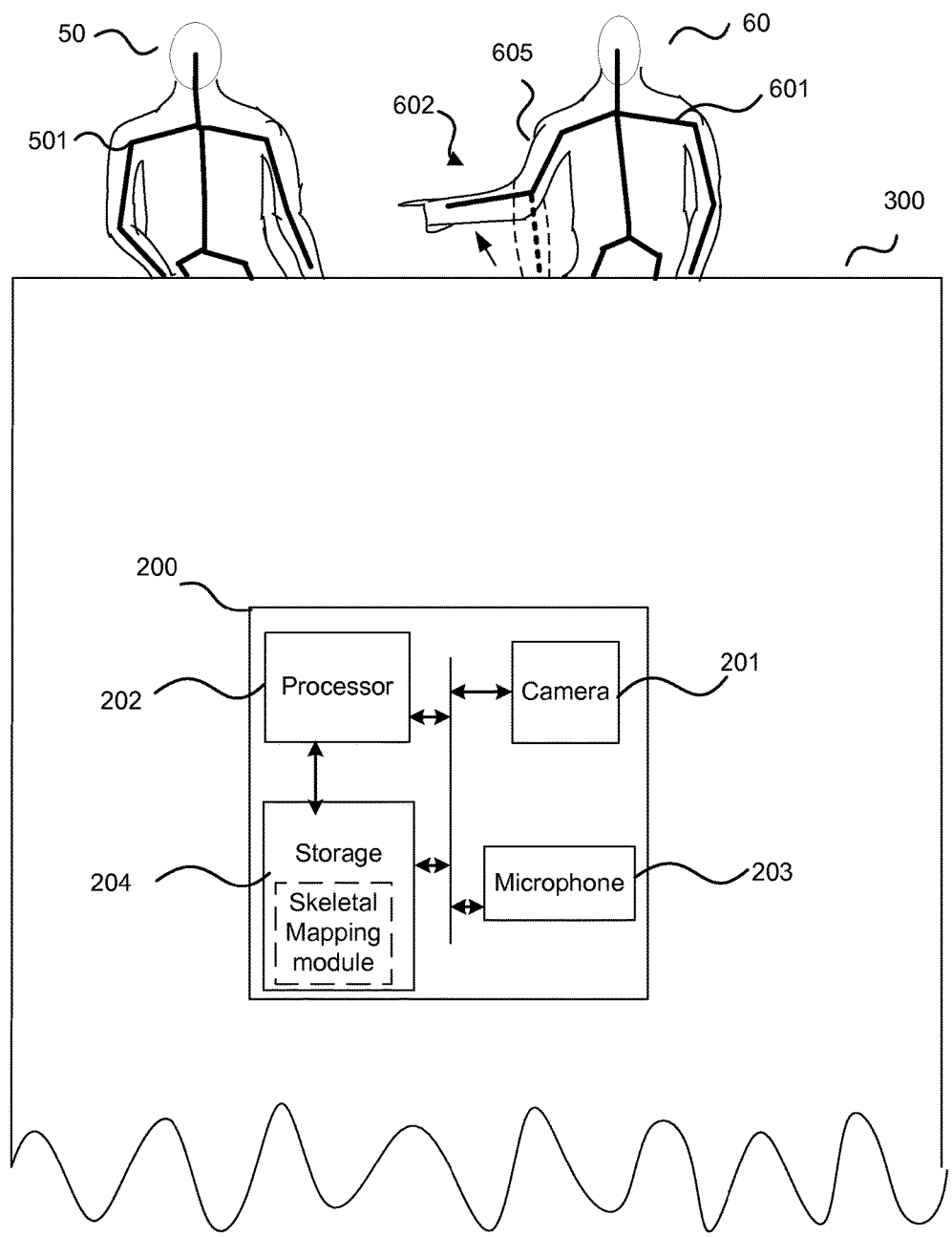
FIGS. 3A and 3B illustrate a gesture with a skeletal map according to an embodiment.
Figure 3B:
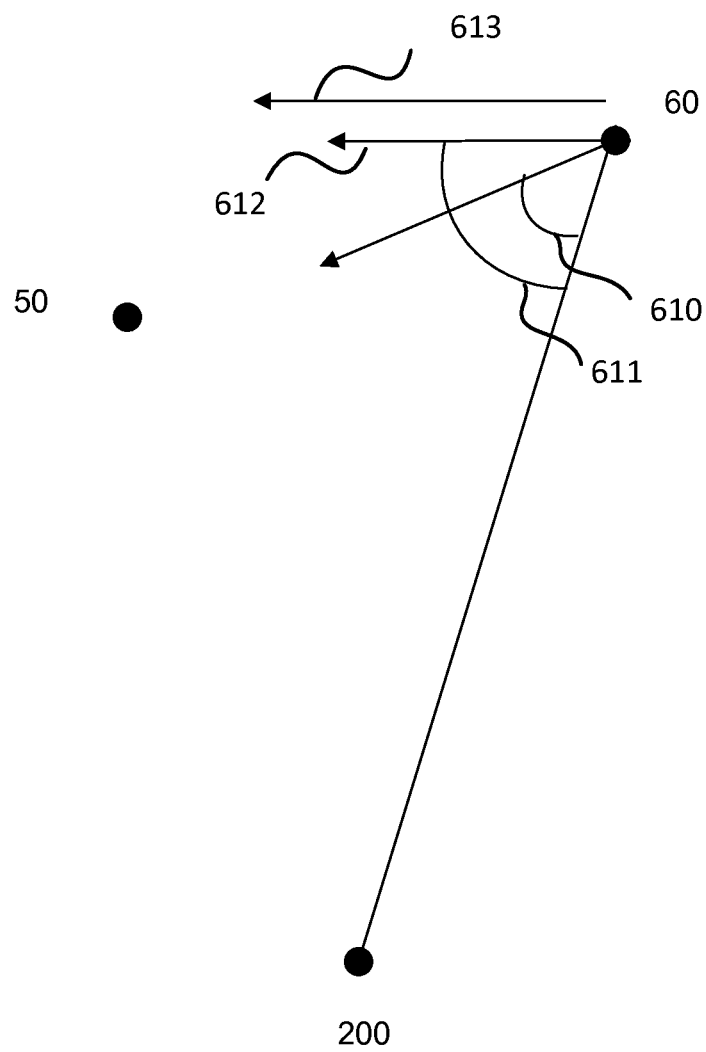

FIG. 3A and FIG. 3B illustrate an exemplary gesture according to an embodiment. Referring to FIG. 3A, a device 200 may be disposed in the middle of a table 300. Participants 50 and 60 may be sitting around a table 300. A participant 60 may be speaking and be referred to as speaker. A microphone 203 may capture the speech and send it to a processor 202 for voice recognition and conversion to text. A camera 201 may capture a video of the meeting and send it to a processor 202 for detection, recognition and identification of participants. A processor 202 may generate and maintain a location awareness of the participants in the meeting by analyzing a video from a camera 201 and/or audio from a microphone 203. According to an embodiment a processor may maintain real-time skeletal maps 501, 601 of the participants 50, 60. A processor 202 may identify, by facial recognition, a speaker 60 and associate digital text to them. Further when participant 60 makes a gesture, for example, a pointing gesture 602 towards participant 50 with their arm 605, a processor 202 may recognize it and compare it to a list of stored gestures. The comparison may be, for example, based upon parameters like angles between or shapes formed by skeletal lines comprising a gesture in a skeletal map. Based on an annotation associated with a gesture 602, a processor 202 may associate the annotation with the digital text obtained by speech to text conversion of speech of a speaker 60. A gesture may be directed towards a target, for example towards participant 50 in FIG. 3. A processor 202 may use an awareness of the location of participants together with the direction of a gesture 602 to determine the intended target of a gesture.

Referring to FIG. 3B, a processor 202 may find an actual angle 610 of a gesture making limb with respect to a reference line, for example, a line connecting the device 200 to a participant 60 and using already calculated locations of participants, identify the intended target. This may be done, for example, by measuring the apparent length 612 of at least a part of gesturing making limb and comparing the apparent length with the true length 613 of the at least part of a limb in a stretched position. An apparent angle 61 of the limbs with respect to the reference line may be also known. Other trigonometric methods may also be used for identifying a gesture and/or determining the target of a gesture.

In an embodiment, at least one camera 201 and at least one microphone 203 may be configured so as to be wholly contained within a device 200. In an embodiment, the device 200 may be placed substantially in the center of a table around which participants of a meeting may sit or be located. In an embodiment, multiple cameras 201 and multiple microphones 203 may be configured throughout a meeting space, for example, a meeting room. The multiple cameras 201 and multiple microphones 203 may be coupled to at least one processor 202 and/or at least one storage 204.

According to an embodiment, some elements of nonverbal communication of a meeting may be captured in meeting transcripts by annotations based on physical gestures. According to an embodiment, the natural pointing gesture used, for example, when assigning a task to a person in a meeting may be assigned an annotation of "action point". According to an embodiment, a pointing gesture towards a white board or a display screen may be assigned an annotation of "reference to contents of the whiteboard/screen". The annotation in such a case may include, among other possible information, a time stamp and/or a digital copy of the contents of the white board etc. According to an embodiment, transcriptions may be developed by using user specific voice recognition profiles for speech to digital text conversion. According to an embodiment, the device 200 may generate meeting transcripts with annotations without the need for verbal cues. According to an embodiment, generation of meeting transcripts and annotation may be carried out, in real time, without affecting the natural progress of a meeting. According to an embodiment, generation of action points may be carried out indicating tasks for the participants of the meeting based on the annotations. According to embodiment, the annotations and actions points may be generated automatically without a specific effort by the participants other than described.

Figure 4:
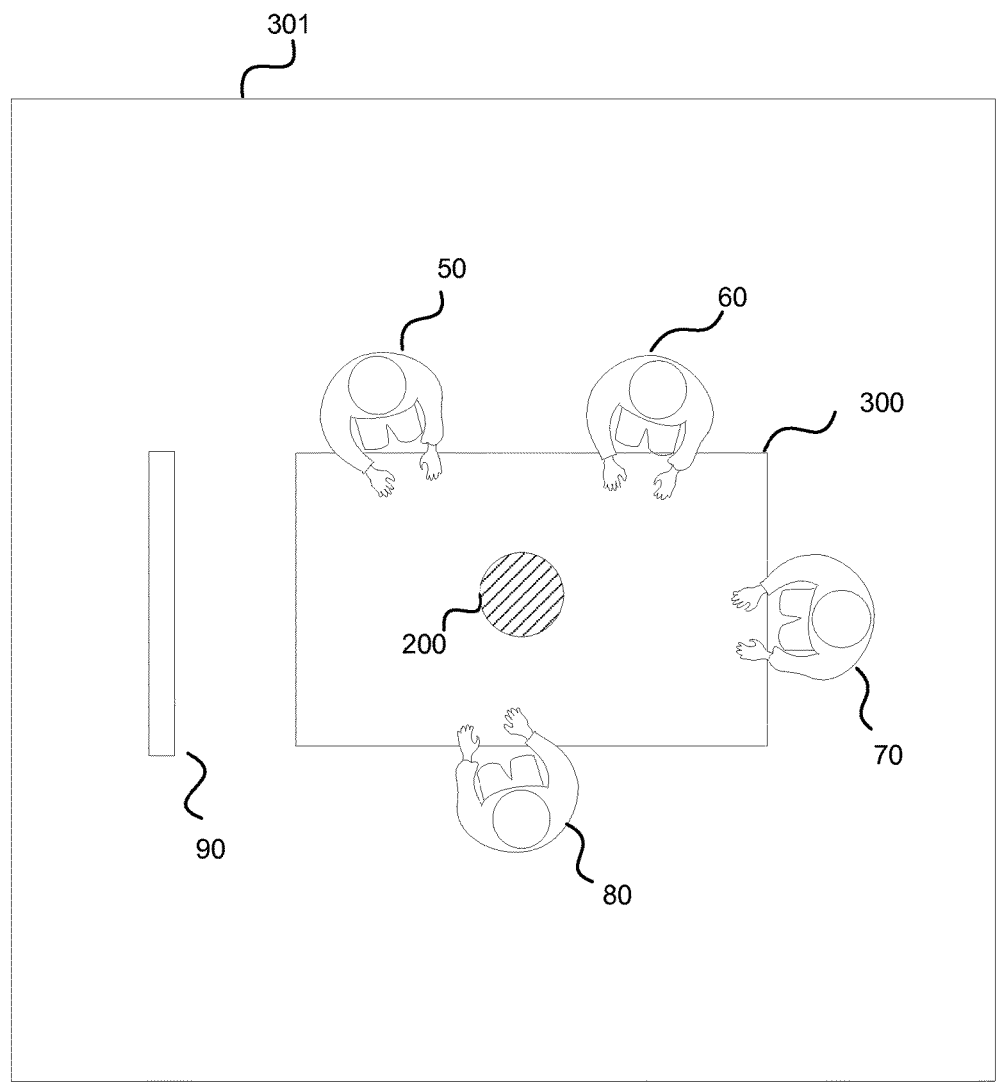
FIG. 4 illustrates a device configuration in a meeting space according to an embodiment.

FIG. 4 illustrates a top view of a configuration of the device 200 in a meeting space 301. According to the embodiment illustrated in FIG. 4, a device 200 is disposed substantially in the center of a table 300, which is disposed in a meeting space 301. Participants 50, 60, 70, and 80 and a physical object 90. In an embodiment, a location awareness may comprise a 3 dimensional coordinate system originating at the device 200. The device 200 may assign coordinates to each the participants in the meeting. According to an embodiment, the device 200 may comprise a single 360° camera or a co-located array of cameras configured to capture 360° video. A camera configured to capture 360° video may capture video in all directions in one or more planes. According to an embodiment, the device 200 may comprises a 360° microphone or a co-located array of microphones configured to capture 360° audio.

Figure 5:
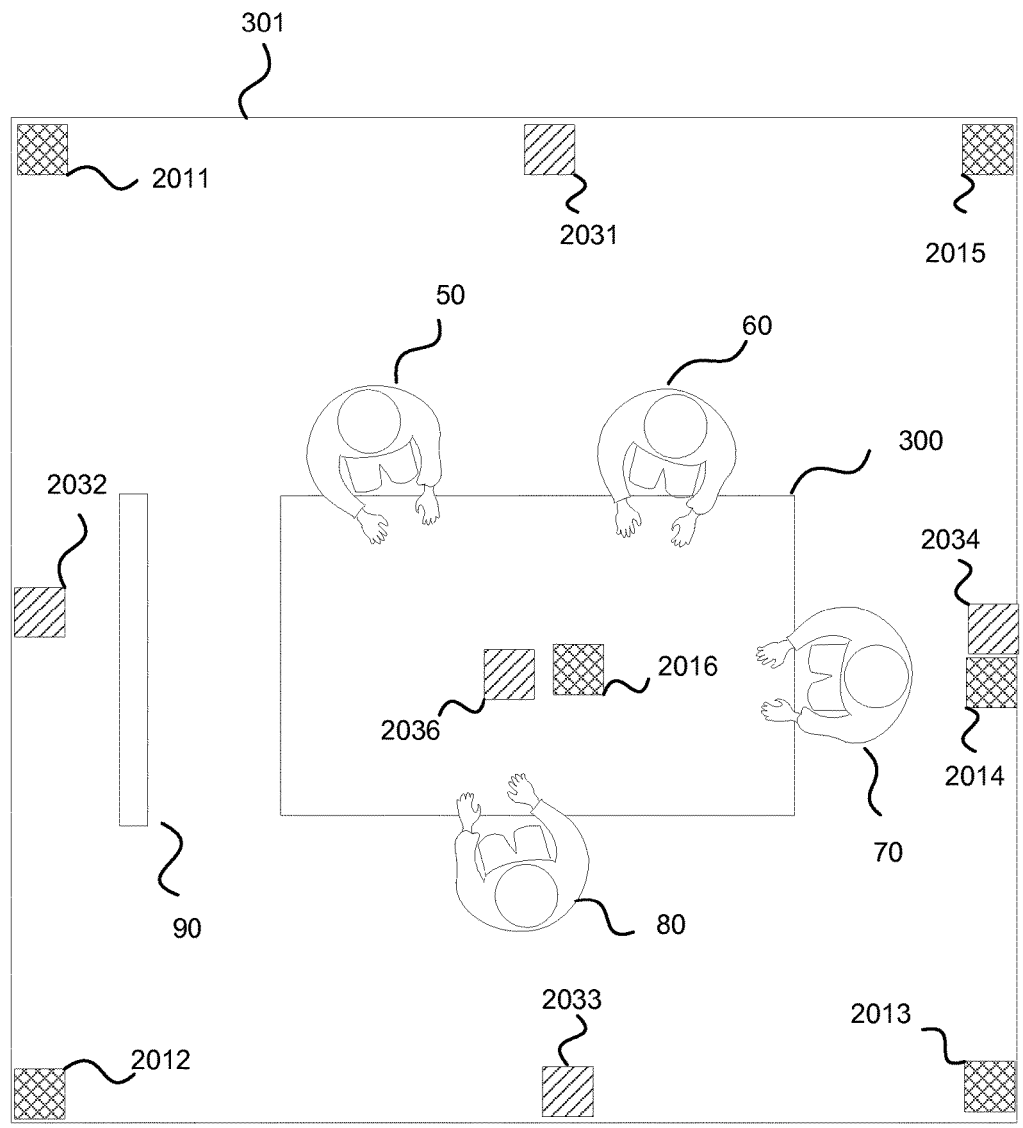
FIG. 5 illustrates another device configuration in a meeting space according to an embodiment.

FIG. 5 illustrates a top view of another exemplary configuration of the device 200 in a meeting space 301. At least one of the cameras 2011, 2012, 2013, 2014 and 2015 comprising the device 200 may be disposed at various locations in side the meeting space 301. Similarly microphones 2031, 2032, 2033, 2033, 2034 and 2035 may be disposed at various locations around a meeting space 301. In an embodiment, at least one microphone 2036 and/or at least one camera 2036 may be configured on a table 300 around which the participants 50, 60, 70, and 80 and a physical object 90 may be disposed. In an embodiment, at least one camera 2014 and at least one microphone 2034 may be co-located. There may be various different kinds of configurations to dispose cameras and microphones in the meeting space, and FIG. 5 illustrates one exemplary option how to dispose them.

Although the subject matter disclosed herein may have been described in a language specific to a device, it is to be understood that the same functionality may be implemented as a system where some or all the structural and/or functional components described herein may not be collocated. Specifically the at least one processor 202 and/or the at least a storage 204 need not be collocated with the at least one camera 201 and/or the at least one microphone. This includes, but is not limited to, implementations over a wired or wireless network and cloud based implementations.

Figure 6:
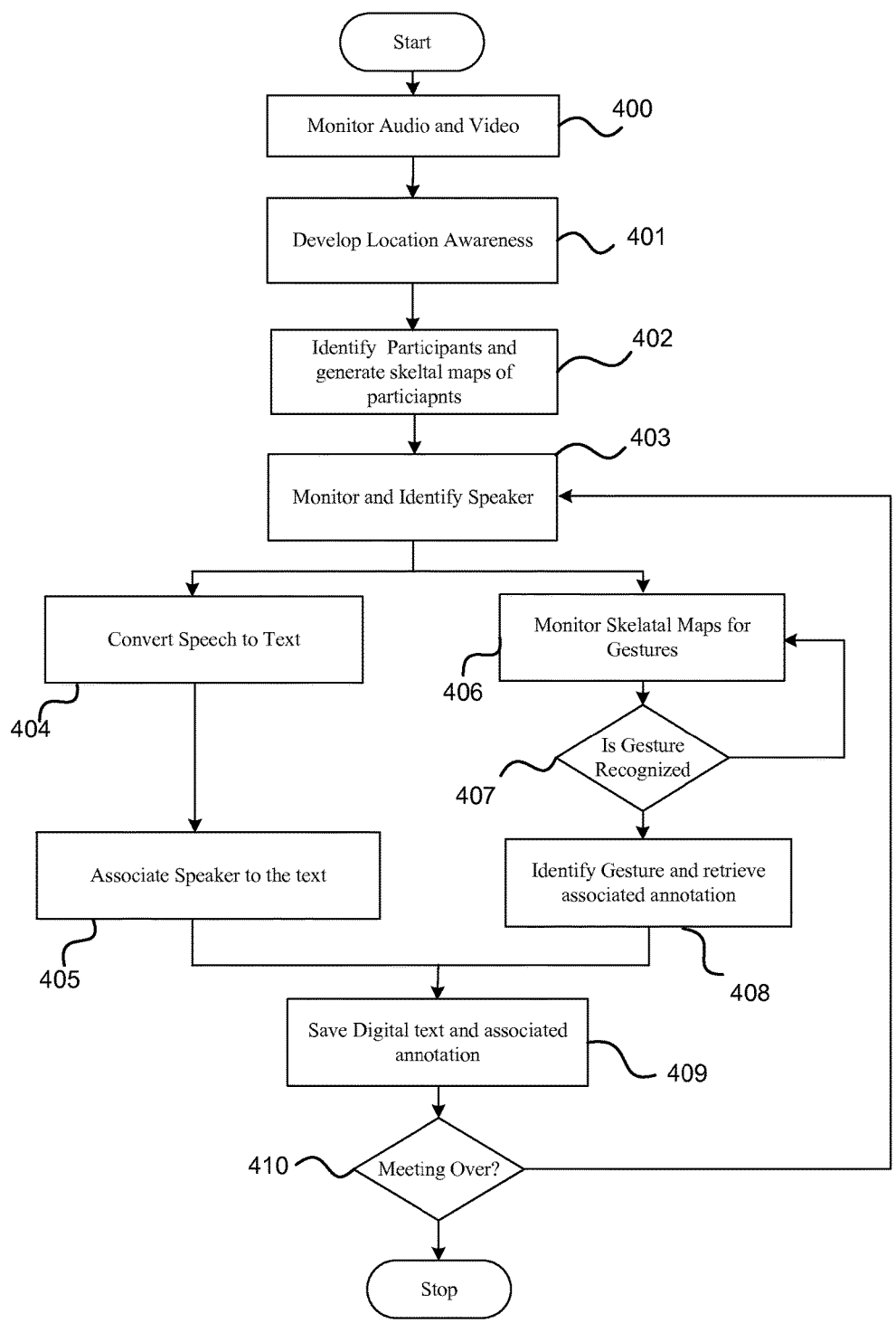
FIG. 6 illustrates a schematic flow chart of a method to annotate transcriptions of a meeting in accordance with an embodiment; and, FIG. 7 illustrates a portion of an exemplary meeting transcript as output from a device according to an embodiment.

FIG. 6 illustrates, as a schematic flow chart, a method of generating and annotating transcripts from a meeting in accordance with an embodiment. Referring to FIG. 6, according to an embodiment the method may be utilized in the device 200 illustrated in FIG. 1 and FIG. 2 for annotation of meeting transcripts based upon recognition of gestures made by participants of a meeting. According to an embodiment, the process of FIG. 2 may be compiled into the program code 206, 208.

Step 400 may include monitoring video and audio of a meeting. Monitoring may include discerning individual participants, for example speakers as discussed previously or otherwise participating in the meeting without speaking, in the video as also discerning individual audio streams. Individual participants may be detected by processing frames comprising the video. In an embodiment, acoustic source localization may contribute, at least in part, in detection of participants present in a meeting space 301.

Step 401 may include developing a location awareness of the various participants present in a meeting space 301. Location awareness may include knowledge of positions of various participants and objects in a meeting space relative to each other and/or a reference point. In an embodiment, participants of a meeting and objects present in a meeting space 301 are assigned coordinates in an Euclidean three dimensional coordinate system. Distances between participants and objects in a meeting space may be calculated by image processing techniques and/or audio processing techniques. In an embodiment, knowledge of optics of the cameras and meeting space specific parameters may contribute, at least in part, towards developing a location awareness of participants in a meeting space 301.

Step 402 may include identification of participants detected to be in a meeting space. Identification of participants may include assigning a name or an identification to each of the participants. Image recognition techniques may be applied on the detected participants in a video to identify them. Names may be assigned, for example, from a database, for example, of contacts in a digital enterprise communication suite. According to an embodiment, names and associated pictures of participants of a meeting may be retrieved at the start of the meeting. Further, in step 402, skeletal maps of participants of a meeting may be developed. Skeletal maps may determine and model various pivot points of the bodies of participants detected and identified in the video. Skeletal mapping may be done in real time so as to accurately track participant's gestures. In an embodiment, name of at least one participant may be learned during the meeting by analyzing audio and/or video. In an embodiment, the identification of a speaker is or other participants may be affected, at least in part, analysis of biometric characteristics of the participants. In an embodiment, identifying information may also be read from devices carried by the participants. Such devices may be any device capable of carrying personally identifying information such as, for example, smartphones, electronic ID cards, RFID security cards etc.

Step 403 may include monitoring the meeting space 301 for speakers and identifying a participant who is the primary speaker at that point of time. Monitoring may be based on the received audio signals. Identification of a speaker may be affected by image recognition and/or acoustic source localization in conjunction with a location awareness developed in step 401. In a meeting multiple persons may be speaking simultaneously, but typically one person, the primary speaker, has the floor. The primary speaker, in case of more than one speaker, may be identified by determining head and eye movements and/or orientation of the participants. In case a single primary speaker is indeterminate, multiple speakers may be simultaneously identified.

Step 404 may include converting speech from a primary speaker to digital text. Speech recognition techniques may be used to affect the conversion of speech to digital text. In an embodiment, a speech recognition profile based upon a speaker's identity may be used for speech to digital text conversion. In step 405, the digital text may be associated with the identity of its speaker. Also a point of time of the speech and respective digital text may be detected and obtained.

Step 406, skeletal maps may be continuously monitored to be detect possible gestures by the participants. Detection may be focused on certain parts of participants' skeletal maps depending upon which body parts the predefined gestures involve. Step 407 may include determining whether a gesture detected in the skeletal map of a speaker is recognized as being one from a set of predefined gestures. If no match is found, monitoring of skeletal maps continues in step 406. If a gesture is recognized, its associated annotation is fetched in Step 408.

Step 409 may include associating the annotation fetched in step 408 to the text from step 405 and saving the text. If no gesture is recognized, text associated with a speaker may be saved without an annotation. Further a time and location stamp may be added to the digital text.

In step 410, the status of the meeting is monitored. If the meeting is not over, monitoring and identification may continue in step 403.

Figure 7:
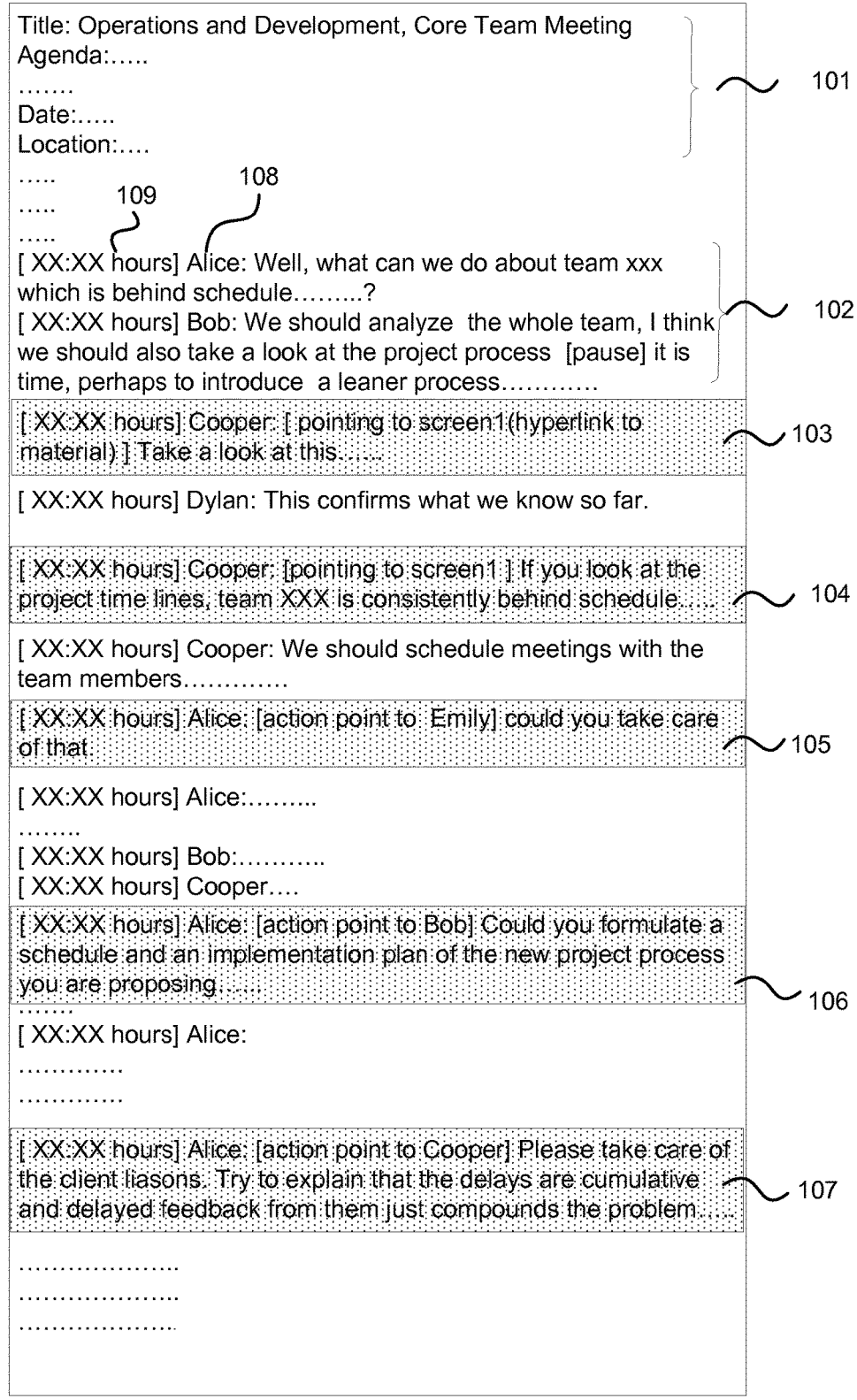

FIG. 7 illustrates an exemplary transcript according to an embodiment. The transcript may comprise indexing data 101 about the meeting. Indexing data 101 may comprise any of the details like title, invitees, agenda, date, location, duration etc. The transcript may comprise simple digital text 102 of the conversations which do not involve any gesture. Digital text may be associated with the name of the speaker 108 and a time stamp 109. Some portions 103, 104,105,106, 107 of the transcript may comprise annotations based on recognized gestures. In some cases, like in portions 103, 104 of the transcript, the annotation may highlight a meeting aid referred to by the speaker. In an embodiment, such an annotation may include a hyperlink to the content displayed or played by a meeting aid. For example, the content played or displayed at the time of the gesture may be recorded or retrieved over a network. In some cases, like in portions 105, 106, 107, annotation of the digital text may include action points. Action points may indicate instructions from one participant to one or more participants regarding a task. In an embodiment, annotated digital text may be highlighted to increase ease of use. In an embodiment a summary may be provided comprising all the action points of a meeting. In an embodiment, a summary may list all the content referred to in a meeting. According to an embodiment, the annotations may be user defined. Various annotations may be defined for different gestures. Although specific annotations may have been discussed herein, they are intended only as examples and not in any way may be construed as limitations.

The methods and functionalities described herein may be performed by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store, parts or all of, an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

According to an embodiment, a system is disclosed, the system comprising: a processor and a storage comprising a set of instructions; wherein the set of instructions causes a processor to: receive an audio recording containing speech of a participant of a meeting; receive a video of the participant; identify the participant; convert the speech of the participant to a digital text; develop a skeletal map of the participant; recognize a gesture of the participant from the skeletal maps; detect and identify a target of the gesture; based on the target and the gesture, determine an annotation for the digital text corresponding to a point of time of the gesture.

According to or in addition to above embodiment, the annotation comprises a time stamp including the point of time of the gesture and an action point directed towards the target of the gesture. According to or in addition to above embodiments, the action point comprises assignment of a task by the speaking participant to one or more participants of the meeting. According to or in addition to above embodiments, the instructions comprising the storage further cause the processor to develop an awareness of a location of the participant and the at least one target. According to or in addition to above embodiments, the awareness of the location comprises coordinates of the participant and the target in a multidimensional coordinate system. According to or in addition to above embodiments, the target comprises: at least one physical object or at least one participant of the meeting; or at least one participant of the meeting and at least one physical object. According to or in addition to above embodiments, the system further comprises at least one microphone and at least one camera, wherein the processor receives the speech of a participant from the at least one microphone and video of the participant from the at least one camera. According to or in addition to above embodiments, the microphone comprises an array of directional microphones. According to or in addition to above embodiments, the system further comprises multiple cameras wherein the cameras are configured throughout a meeting space in a distributed fashion. According to or in addition to above embodiments, the system further comprises multiple microphones wherein microphones are configured throughout a meeting space in a distributed fashion. According to or in addition to above embodiments, a recognition and identification of a participant of the meeting is affected by biometric recognition. According to or in addition to above embodiments, a recognition and identification of a participant of the meeting is affected by reading identifying information from a device carried by the participant. According to or in addition to above embodiments, wherein the instructions comprising the storage further cause the processor to develop skeletal maps of all participants of the meeting. According to or in addition to above embodiments, a recognition of the gesture includes monitoring the skeletal map of the speaker and comparing the detected gesture with a set of predefined gestures. According to or in addition to above embodiments, a speaker specific speech recognition profile is used for speech to digital text conversion.

According to an embodiment. a device is disclosed, the device comprising: at least one microphone; at least one camera; at least one processor; and at least one storage comprising a set of instructions; wherein the set of instructions causes a processor to: receive from the at least one microphone, an audio recording containing speech of at least one participant of a meeting; receive from a camera, a video of the at least one participant; identify the at least participant; convert the speech to a digital text; develop skeletal maps of the at least participant; recognize at least one gesture of the participant from the skeletal maps; detect and identify at least one target of the at least one gesture; based on the at least one target and the at least one gesture, determine an annotation for the digital text corresponding to a point of time of the at least one gesture.

According to or in addition to above embodiment, the device further comprises a gyroscope capable of measuring an angle of tilt of the camera, wherein the angle is used to measure distance of a participant from the camera.

According to an embodiment a method is disclosed, the method comprising: receiving a speech of at least one participant of a meeting; receiving a video of the at least one participant; identifying the at least one participant; converting the speech to a digital text; developing skeletal maps of the at least one participant; recognizing at least one gesture of the at least one participant from the skeletal maps; detecting and identifying at least one target of the at least one gesture; based on the at least one target and the at least one gesture, determining an annotation for the digital text corresponding to a point of time of the at least one gesture.

According to or in addition to above embodiment, the method further comprises developing a location awareness of the at least one participant and the at least one target. According to or in addition to above embodiments, identification of the at least one participant is affected by biometric recognition.

The invention claimed is:

1. A system, comprising:
   a 360-degree camera configured to capture images within a 360-degree view;
   at least one processor; and
   storage comprising a set of instructions executable by the at least one processor to:
   receive an audio recording containing speech of a first participant of a meeting;

receive, from the 360-degree camera, a video comprising the 360-degree view that includes the first participant;

generate a three-dimensional coordinate mapping identifying where the first participant and a second participant are located in the 360-degree view of the video;

convert the audio recording of the first participant to digital text;

identify a gesture of the first participant directed at the second participant in the 360-degree view;

determine, based on the three-dimensional coordinate mapping, the first participant is directing the gesture toward the second participant; and store an annotation for the digital text corresponding to the gesture being directed to the second participant.

2. The system of claim 1, wherein the annotation comprises a time stamp including a point of time of the gesture.

3. The system of claim 1, further comprising an action point that comprises assignment of a task by the first participant to the second participant.

4. The system of claim 1, wherein the instructions further cause the at least one processor to develop an awareness of a location of the first participant relative to the second participant.

5. The system of claim 4, wherein the instructions are further configured to determine a task assigned to the second participant based on the gesture of the first participant and the direction of said gesture.

6. The system of claim 1, wherein the second participant is positioned, relative to the 360-degree camera, at an angle greater than 90 degrees from the first participant.

7. The system of claim 1, further comprising at least one microphone and at least one camera, wherein the at least one processor receives the audio recording of the first participant from the at least one microphone and video of the participant from the 360-degree camera.

8. The system of claim 7, wherein the microphone comprises an array of directional microphones.

9. The system of claim 7, further comprising multiple cameras wherein the cameras are configured throughout a meeting space in a distributed fashion.

10. The system of claim 7, further comprising multiple microphones wherein microphones are configured throughout a meeting space in a distributed fashion.

11. The system of claim 1, wherein a recognition and identification of the first or second participant of the meeting is affected by biometric recognition.

12. The system of claim 1, wherein the first or second participant is recognized through electronically reading identifying information from a device carried by the participant.

13. The system of claim 1, wherein the instructions further cause the at least one processor to develop a skeletal map of the first or second participant.

14. The system of claim 13, wherein the instructions further cause the at least one processor to compare the detected gesture with a set of predefined gestures using the skeletal map.

15. The system of claim 1, wherein the instructions further comprise a speaker specific speech recognition profile executable by the at least one processor to convert the audio recording of the participant to the digital text.

16. A device, comprising:
at least one microphone; at least one 360-degree camera;
at least one processor; and at least one storage comprising a set of instructions; wherein the set of instructions causes a processor to:
receive from the at least one microphone, speech of a first participant of a meeting;
receive from the 360-degree camera, a video of the first participant;
generate a three-dimensional coordinate mapping identifying where the first participant and a second participant are located in the 360-degree view of the video;
convert the speech of the first participant to a-digital text;
recognize at least one gesture of the first participant;
determine, based on the three-dimensional coordinate mapping, the first participant is directing the at least one gesture toward the second participant; and
store an annotation for the digital text corresponding to the at least one gesture being directed to the second participant.

17. The device of claim 16, further comprising a gyroscope capable of measuring an angle of tilt of the camera, wherein the angle is used to measure distance of one or more participants from the camera.

18. A method, comprising:
receiving an audio recording containing speech of a first participant of a meeting;
receiving a 360-degree view of video comprising the first participant;
generating a three-dimensional coordinate mapping identifying where the first participant and a second participant are located in the 360-degree view of the video;
converting the audio recording of the first participant to digital text;
identifying a suspected gesture of the first participant directed at the second participant in the 360-degree view of the video;
determining, based on the three-dimensional coordinate mapping, the first participant is directing the gesture toward the second participant; and
storing an annotation for the digital text corresponding to a point of time of the at least one gesture and indicating that the at least one gesture is directed from the first participant to the second participant.

19. The method of claim 18, further comprising developing a location awareness of the first participant and the second-participant using the three-dimensional coordinate mapping.

20. The method of claim 18, wherein identification of the first or second participant is performed using biometric recognition on the 360-degree view of video.

* * * * *